US009558743B2

(12) United States Patent
Coccaro et al.

(10) Patent No.: US 9,558,743 B2
(45) Date of Patent: Jan. 31, 2017

(54) INTEGRATION OF SEMANTIC CONTEXT INFORMATION

(71) Applicant: Google Inc., Mountain View, CA (US)

(72) Inventors: Noah B. Coccaro, Mountain View, CA (US); Patrick An Nguyen, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 662 days.

(21) Appl. No.: 13/863,505

(22) Filed: Apr. 16, 2013

(65) Prior Publication Data

US 2014/0278379 A1    Sep. 18, 2014

Related U.S. Application Data

(60) Provisional application No. 61/787,833, filed on Mar. 15, 2013.

(51) Int. Cl.
| | |
|---|---|
| *G10L 15/00* | (2013.01) |
| *G10L 15/16* | (2006.01) |
| *G10L 15/18* | (2013.01) |
| *G10L 25/30* | (2013.01) |

(52) U.S. Cl.
CPC ....... *G10L 15/1815* (2013.01); *G10L 15/1822* (2013.01); *G10L 25/30* (2013.01)

(58) Field of Classification Search
CPC ....... G10L 15/1815; G10L 15/00; G10L 15/16
USPC .......................................... 704/202, 230–240
See application file for complete search history.

(56) References Cited

U.S. PATENT DOCUMENTS

| | | | | |
|---|---|---|---|---|
| 2003/0033145 A1* | 2/2003 | Petrushin | ................ | G10L 17/26 704/236 |
| 2004/0167778 A1* | 8/2004 | Valsan | .................... | G10L 15/16 704/231 |
| 2009/0265163 A1* | 10/2009 | Li | ....................... | G06F 17/2785 704/10 |
| 2010/0145678 A1* | 6/2010 | Csomai | ............... | G06F 17/2755 704/9 |
| 2011/0131042 A1* | 6/2011 | Nagatomo | .............. | G10L 15/18 704/240 |

(Continued)

OTHER PUBLICATIONS

Mikolov et al., "Context Dependent Recurrent Neural Network Language Model", In SLT, Jul. 2012, pp. 234-295.*

(Continued)

*Primary Examiner* — Pierre-Louis Desir
*Assistant Examiner* — Seong-Ah A. Shin
(74) *Attorney, Agent, or Firm* — Fish & Richardson P.C.

(57) ABSTRACT

In one implementation, a computer-implemented method includes receiving, at a computer system, a request to predict a next word in a dialog being uttered by a speaker; accessing, by the computer system, a neural network comprising i) an input layer, ii) one or more hidden layers, and iii) an output layer; identifying the local context for the dialog of the speaker; selecting, by the computer system and using a semantic model, at least one vector that represents the semantic context for the dialog; applying input to the input layer of the neural network, the input comprising i) the local context of the dialog and ii) the values for the at least one vector; generating probability values for at least a portion of the candidate words; and providing, by the computer system and based on the probability values, information that identifies one or more of the candidate words.

20 Claims, 6 Drawing Sheets

(56) References Cited

U.S. PATENT DOCUMENTS

| | | | | |
|---|---|---|---|---|
| 2013/0262096 A1* | 10/2013 | Wilhelms-Tricarico | G10L 25/90 | 704/202 |
| 2014/0025382 A1* | 1/2014 | Chen | G10L 13/02 | 704/260 |
| 2014/0201126 A1* | 7/2014 | Zadeh | G06K 9/627 | 706/52 |
| 2014/0372112 A1* | 12/2014 | Xue | G10L 15/16 | 704/232 |
| 2015/0066496 A1* | 3/2015 | Deoras | G10L 15/16 | 704/232 |

OTHER PUBLICATIONS

Coccaro, "Latent semantic analysis as a tool to improve automatic speech recognition performance", Northwestern university thesis, 2005.*

Zhang et al., "Improve Latent Semantic Analysis Based Language Model by Integrating Multiple Level Knowledge", Carnegie Mellon Univ., 2002.*

Nakamura et al., "Neural network approach to word category prediction for English texts." Proceedings of the 13th conference on Computational linguistics—vol. 3. Association for Computational Linguistics, 1990.*

Mitchell et al., "Language models based on semantic composition." Proceedings of the 2009 Conference on Empirical Methods in Natural Language Processing: vol. 1—vol. 1. Association for Computational Linguistics, 2009.*

Wermter, "Neural network agents for learning semantic text classification." Information Retrieval 3.2 (2000): 87-103.*

Wandmacher et al., "Methods to integrate a language model with semantic information for a word prediction component."arXiv preprint arXiv:0801.4716 (2008).*

Auli et al. "Joint Language and Translation Modeling with Recurrent Neural Networks." EMNLP. vol. 3. No. 8. 2013.*

Coccaro, "Latent Semantic Analysis as a Tool to Improve Automatic Speech Recognition Performance," Northwestern University Thesis, 2005, 102 pages.

Coccaro and Jurafsky, "Towards Better Integration of Semantic Predictors in Statistical Language Modeling," *Proceedings for ICSLP-98*, 1998, 6:2403-2406.

* cited by examiner

INTEGRATION OF SEMANTIC CONTEXT INFORMATION

CROSS-REFERENCE TO RELATED APPLICATION

This application claims priority to U.S. Provisional Application Ser. No. 61/787,833, filed on Mar. 15, 2013, the entire contents of which are hereby incorporated by reference.

TECHNICAL FIELD

This specification generally describes computer-based speech modeling and speech recognition.

BACKGROUND

Computer-based speech recognition techniques have used local contexts (e.g., previous 2 words uttered by a user) to predict a next word that a user is going to say. For example, techniques have used neural networks (e.g., recurrent neural networks (RNNs)) to provide such predictions. For instance, a recurrent neural network can include an input layer with nodes that represent a vocabulary of words, one or more hidden layers with nodes that are fully connected to the nodes of the input layer, and an output layer with nodes that are fully connected to the nodes of one of the hidden layers. Input can be provided to the input layer by activating one or more of the nodes of the input layer (e.g., providing the one or more nodes with a predetermined value) that correspond to the word(s) that are part of the local context. The activation value can be propagated through the connections in the neural network and can cause probability values for words corresponding to the nodes of the output layer to be output. The probability values can indicate how likely the words corresponding to the nodes are to be a "next word" that is uttered by a user. For example, probability values can be used to help differentiate between whether a user said "surgeon" or "sturgeon," which a speech recognition system may be unable to differentiate between with a reliable degree of certainty.

SUMMARY

This document describes techniques, methods, systems, and computer program products for incorporating semantic context information (e.g., vector from semantic context modeled through latent semantic analysis (LSA)) with a language model (e.g., neural network model). Semantic context information can identify how likely particular words are to appear within one or more contexts, such as in a conversation between two users. Information modeling a semantic context for speech uttered by a user can be incorporated as input to a language model that models a local context to provide a more accurate and prediction of one or more words that are likely to be uttered next by a user. For example, if a local context for a speech signal is "it is a," the local context is unlikely to provide a good indication of a next word to be uttered by the user. However, by incorporating semantic context information that models the likelihood of words appearing within a current context for the speech signal (e.g., user is discussing torn ACL), a more accurate prediction of words that are likely to be uttered by the user can be provided (e.g., more likely to say "surgeon" than "sturgeon" when semantic context taken into consideration).

In one implementation, a computer-implemented method includes receiving, at a computer system, a request to predict a next word in a dialog being uttered by a speaker; accessing, by the computer system, a neural network comprising i) an input layer that includes a first portion representing a local context for the dialog and a second portion representing a semantic context for the dialog, ii) one or more hidden layers that are at least partially interconnected with the input layer by first connections, and iii) an output layer that represents a vocabulary of candidate words and that is at least partially interconnected with at least one of the one or more hidden layers by second connections; identifying the local context for the dialog of the speaker; selecting, by the computer system and using a semantic model, at least one vector that represent the semantic context for the dialog, the at least one vector including values for a plurality of dimensions; applying input to the input layer of the neural network, the input comprising i) the local context of the dialog and ii) the values for the plurality of dimensions of the at least one vector that represents the semantic context of the dialog; generating probability values for at least a portion of the candidate words in the vocabulary of the output layer based on propagation of the input through the neural network using, at least, the first connections and the second connections between layers of the neural network; and providing, by the computer system and based on the probability values, information that identifies one or more of the candidate words.

Such a computer-implemented method can optionally include one or more of the following features. The local context can include either i) at least one preceding word from a current position in the dialog that was uttered by the speaker or ii) a start of sentence token that indicates that the next word is a first word being uttered by the speaker. The first portion of the input layer can include a plurality of nodes that represent a plurality of words, and applying the local context as part of the input to the input layer can include providing a predetermined value to a portion of the plurality of nodes that correspond to the at least one preceding word that comprises the local context, the predetermined value indicating that a word is part of the local context for the dialog. The plurality of words can include the vocabulary of candidate words. The first portion of the input layer can include a plurality of first nodes that represent a plurality of words, a particular hidden layer from the one or more hidden layers can include a plurality of hidden nodes, and a first portion of the first connections can fully connect the plurality first nodes with the plurality of hidden nodes such that each of the plurality of first nodes is connected to each of the plurality of hidden nodes. The second portion of the input layer can include a plurality of second nodes that represent the plurality of dimensions of the at least one vector, the input applied to the second nodes comprising the values for the plurality of dimensions, the values for the plurality of dimensions comprising centroids of at least a portion of the plurality of words in the semantic context for the dialog, and a second portion of the first connections can fully connect the plurality second nodes with the plurality of hidden nodes such that each of the plurality of second nodes is connected to each of the plurality of hidden nodes. The second portion of the input layer can include a plurality of second nodes that represent the plurality of words, the input applied to the second nodes including values that represent distances from the plurality of words to the semantic context for the dialog that is represented by the at least one vector, and a second portion of the first connections can fully connect the plurality second nodes with the plurality of hidden nodes such that each of the plurality of second nodes is connected to each of the plurality of hidden nodes.

A particular hidden layer from the one or more hidden layers can include a plurality of hidden nodes, the output layer can include a plurality of output nodes that represent the vocabulary of candidate words, and the second connections can fully connect the plurality hidden nodes with the plurality of output nodes such that each of the plurality of hidden nodes is connected to each of the plurality of output nodes, each of the second connections including a weighting value that quantifies an association between two nodes and that is used to propagate the input values through the neural network. The semantic model can include a latent semantic analysis (LSA) model. The semantic model can include a latent dirichlet allocation (LDA) model. The computer-implemented method can further include obtaining an identity of the speaker; selecting, using the identity of the speaker, one or more portions of text that were written by the speaker or that were transcribed from previous verbal communication by the speaker; and generating at least a portion of the semantic context based on the selected one or more portions of text. The computer-implemented method can further include obtaining an identity of at least one other user with whom the speaker is having the dialog; and the one or more portions of text can be selected further using the identity of the at least one other user such that the one or more portions of text were written or spoken to the at least one other user. The computer-implemented method can further include obtaining a transcription of one or more previous utterances spoken by the speaker or to the speaker by another during the dialog; and generating at least a portion of the semantic context based on the obtained transcription. The computer-implemented method can further include selecting the one or more candidate words from the vocabulary of candidate words based on the one or more candidate words having the greatest probability values from among the generated probability values.

In another implementation, a computer system includes one or more computers; an interface to the one or more computers that is programmed to receive a request to predict a next word in a dialog being uttered by a speaker; a neural network module that is programmed to access a neural network comprising i) an input layer that includes a first portion representing a local context for the dialog and a second portion representing a semantic context for the dialog, ii) one or more hidden layers that are at least partially interconnected with the input layer by first connections, and iii) an output layer that represents a vocabulary of candidate words and that is at least partially interconnected with at least one of the one or more hidden layers by second connections; a local context module that is programmed to identify the local context for the dialog of the speaker; a semantic context generator that is programmed to select, using a semantic model, at least one vector that represent the semantic context for the dialog, the at least one vector including values for a plurality of dimensions; and a probability generator that is programmed to: apply input to the input layer of the neural network, the input comprising i) the local context of the dialog and ii) the values for the plurality of dimensions of the at least one vector that represents the semantic context of the dialog, generate probability values for at least a portion of the candidate words in the vocabulary of the output layer based on propagation of the input through the neural network using, at least, the first connections and the second connections between layers of the neural network, and provide, based on the probability values, information that identifies one or more of the candidate words.

Such a computer system can optionally include one or more of the following features. The local context can include at least one preceding word from a current position in the dialog that was uttered by the speaker. The first portion of the input layer can include a plurality of nodes that represent a plurality of words, and applying the local context as part of the input to the input layer can include providing a predetermined value to a portion of the plurality of nodes that correspond to the at least one preceding word that comprises the local context, the predetermined value indicating that a word is part of the local context for the dialog. The semantic model can include a latent semantic analysis (LSA) model. The semantic model comprises a latent dirichlet allocation (LDA) model.

In another implementation, a computer program product embodied in a computer readable storage device storing instructions that, when executed, cause one or more computing devices to perform operations that include receiving a request to predict a next word in a dialog being uttered by a speaker; accessing a neural network comprising i) an input layer that includes a first portion representing a local context for the dialog and a second portion representing a semantic context for the dialog, ii) one or more hidden layers that are at least partially interconnected with the input layer by first connections, and iii) an output layer that represents a vocabulary of candidate words and that is at least partially interconnected with at least one of the one or more hidden layers by second connections; identifying the local context for the dialog of the speaker; selecting, using a semantic model, at least one vector that represent the semantic context for the dialog, the at least one vector including values for a plurality of dimensions; applying input to the input layer of the neural network, the input comprising i) the local context of the dialog and ii) the values for the plurality of dimensions of the at least one vector that represents the semantic context of the dialog; generating probability values for at least a portion of the candidate words in the vocabulary of the output layer based on propagation of the input through the neural network using, at least, the first connections and the second connections between layers of the neural network; and providing, based on the probability values, information that identifies one or more of the candidate words.

Certain implementations may provide one or more of the following advantages. For example, more accurate and reliable predictions of a next word to be uttered by a user can be provided regardless of whether the local context provides a good indication of a next word. For instance, prior techniques using local context for speech recognition may not accurately model a semantic context within which a user is speaking when the local context is occupied by more generic terms, such as the phrase "it is." By incorporating semantic context information as input for speech recognition, the semantic context (e.g., discussion of knee injuries) can more accurately be taken into consideration so as to provide improved indications of what words are likely to be uttered next by a user (e.g., "surgeon") and what words are not (e.g., "sturgeon").

In another example, the semantic context can be dynamically adjusted so as to more accurately model the context for a particular user and speech that is being recognized for the user. For instance, a semantic context can be modeled based on information that is specific to a particular user, such as transcribed speech (e.g., previously transcribed speech) for and correspondence that was written by the user (e.g., emails, text messages, social network posts, blog entries). Additionally, the semantic context can be modeled to include previous dialogs that are specific to a current dialog that is being transcribed, such by using verbal and/or written correspondence between two users who are taking part in the current dialog. In another example, the accuracy of semantically weighty words can be improved rather than function words, which can provide an improvement beyond what the raw word accuracy may indicate.

The details of one or more implementations of the subject matter described in this specification are set forth in the accompanying drawings and the description below. Other potential features, aspects, and advantages of the subject matter will become apparent from the description, the drawings, and/or the claims.

BRIEF DESCRIPTION OF DRAWINGS

Like reference symbols in the various drawings indicate like elements.

DETAILED DESCRIPTION

This document generally describes techniques, methods, systems, and computer program products for incorporating semantic context information with language models, such as neural network, that use local context information to provide indications of which words within a vocabulary are likely to be uttered next by a user. For example, the input layer of a neural network language model can be modified to include nodes through which semantic context information can be input. A variety of different types of semantic context information can be used, such as vectors of semantic context models (e.g., LSA models, latent dirichlet allocation (LDA) models) that represent semantic contexts (e.g., likelihood of words and/or topics appearing within a semantic context) and/or distances between words and semantic contexts.

Figure 1:
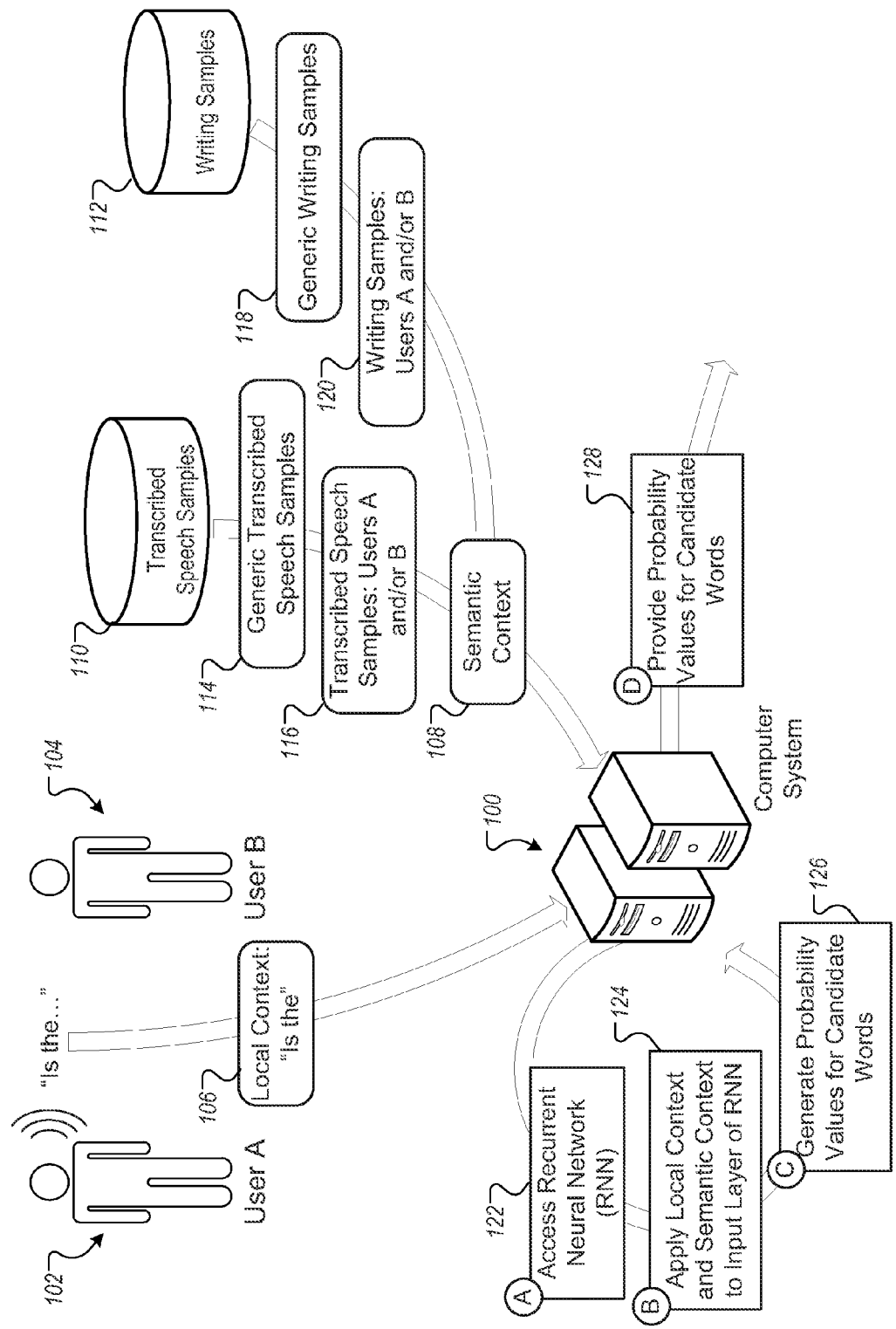
FIG. 1 depicts a conceptual diagram of an example computer system for incorporating semantic information with a neural network model to provide indications of words that are likely to be uttered next by a user.

FIG. 1 depicts a conceptual diagram of an example computer system 100 for incorporating semantic information with a neural network model to provide indications of words that are likely to be uttered next by a user. The example computer system 100 can be any of a variety of appropriate computer systems, such as a desktop computer, a laptop computer, a mobile computing device (e.g., smartphone), a distributed computing system (e.g., cloud computing system), a server system, or any combination thereof.

The example computer system 100 can take as input a local context for a speech signal and a semantic context, and can provide as output probability values that indicate likelihoods that various words that are part of a candidate vocabulary are a next word that will be uttered by a user. The computer system 100 can be a standalone computer system that receives input and/or provides output. Alternatively, the computer system 100 can be part of a larger speech recognition system that takes audio signals as input, attempts to transcribe the audio signals to text using one or more speech models that map audio signal features parts of spoken language (e.g., phonemes, syllables), and that provides a textual transcript of the audio signals as output. As part of such a larger computer system, the features of the computer system 100 can be used for a variety of aspects of speech recognition, such as providing an indication of which word a user was likely to have uttered. For instance, a speech recognition system may not be able to distinguish between words that sound similar to each other, such as "surgeon" and "sturgeon," with at least a threshold level of accuracy, especially in instances when there are large amounts of background noise and/or low audio quality for the received speech signal. A speech recognition system can access the computer system 100 to provide an indication of which of the similarly sounding words was more likely to have been uttered by a user based on the local context for the speech signal (e.g., previous n words spoken by user) and a semantic context for the speech signal.

In the example depicted in FIG. 1, user A 102 says the phrase "is the" to user B 104. This phrase, "is the," can be a local context 106 for the dialog between user A 102 and user B 104. Such a local context can include any of an appropriate number of preceding words uttered by the speaker (user A 102), such as 1 word, 2 words, 3 words, and/or 5 words. In instances where the word at issue is the first word that has been uttered (no preceding words), the local context 106 can include a start of sentence token that indicates that the word is the first word being uttered, which can bias the model to choose words that typically start sentences and/or utterances. For example, the word "The" may be more likely to start a sentence or utterance than the word "To." However, as described above, such a local context may be inadequate to accurately determine probabilities by which each word in a vocabulary of candidate words is likely to be uttered next by the user A 102.

The computer system 100 can take as additional input a semantic context 108 for the dialog between the user A 102 and the user B. The semantic context 108 can be based on transcribed speech samples 110 and written samples 112 that provide an indication of how words are used in various contexts. The transcribed speech samples 110 and the written samples 112 that are used to form the semantic context 108 can be specific to the speaker (user A 102), specific to the current dialog between users (conversation between user A 102 and user B 104), and/or can be generic and not specific to either the speaker or the current dialog. For instance, the transcribed speech samples 110, which may be transcribed by humans and/or by machines, can include generic transcribed speech samples 114 that can be from other users who are different from users A and B. For instance, the generic transcribed speech samples 114 can be transcriptions of media content (e.g., television shows, movies) and/or public meetings and hearings (e.g., transcriptions of congressional hearings). The generic transcribed speech samples 114 may be selected based on a variety of factors, such as the language for the transcribed speech samples (e.g., American English), the similarity between demographics (e.g., age, gender, geographic location) of the transcribed speaker with regard to the current speaker (user A 102), and/or accuracy of the transcribed speech sample (e.g., high level of confidence for the transcription, transcription is verified to be accuracy (e.g., training data)).

The transcribed speech samples 110 can also include transcribed speech samples 116 that are specific to users who are involved in the current dialog, such as the speaker (user A 102) and the listener (user B 104). For instance, the transcribed speech samples 116 can include previous transcriptions of speech signals that were generated by the user A 102 and/or by the user B 104 (e.g., transcriptions of voicemail messages, verbal commands provided to a computing device). The transcribed speech samples 106 can also include dialogs between the users A 102 and B 104. The transcribed speech samples 116 can further include transcribed and preceding portions of the current dialog between the user A 102 and the user B 104, such as a transcription of the beginning of the dialog between the user A 102 and the user B 104 up until the user A 102 said "it is."

The writing samples 112 can be similar to the transcribed speech samples 110, but can be based on dialog that was generated in writing. Like the transcribed speech samples 110, the writing samples 112 can provide an indication as to how and which words are used in various contexts. The writing samples 112 can include generic writing samples 118 that were written by users other than those involved in the current dialog. Such generic writing samples 118 can include any of a variety of appropriate sources, such as news articles, blog posts, literary works, and/or social network content (e.g., social network posts). The writing samples 112 can also include writing samples that are specific to user A 102 and/or to user B 104, such as content that was written by user A 102 (e.g., email messages, text messages, blog posts, social network posts, articles), content that was written by user B 104, and/or correspondence between users A and B (e.g., email correspondence between users A and B, text messages between users A and B).

The inclusion of the transcribed speech samples 110 and writing samples 112 as part of the semantic context 108 can be done based on user permission. For instance, a user can be asked to provide permission to use transcribed speech samples and/or writing samples as part of a speech recognition system. Where possible, information that may identify a user can be anonymized so that the information does not indicate an identity or any other private information regarding a user.

Each of the different samples from the speech samples 110 and the writing samples 112 may be considered to be a different context. The semantic context 108 can be a combination of different samples (contexts) from the speech samples 110 and the writing samples 112. Such a combination can be generated and modeled in any of a variety of appropriate ways, such as through the use of LSA and/or LDA. For instance, in the example of LSA, the semantic context 108 can be based on one or more vectors that are derived from a matrix of word frequency for various words in a vocabulary across a plurality of samples (documents). The matrix can have the dimensions T×D, where T is the number of terms in the vocabulary and D is the number of documents (samples) for the context, and where the frequencies for the terms in each document are identified within the matrix. Frequencies can be weighted based on a variety of factors, such as based on information that indicates how closely a document and/or term corresponds to the current context for the dialog between users A 102 and B 104. Single value decomposition can be applied to the matrix so as to generate three matrices, T×K, K×K, and K×D, the product of which approximates the original matrix (T×D).

Portions of one or more of these three component matrices (T×K, K×K, and K×D) can be used to represent the semantic context 108. For example, various vectors can be generated from the T×K matrix and used to represent the semantic context 108. For instance, the T×K matrix can be collapsed to a context vector that represents the semantic context by combining the values for the terms (rows) in each context (columns). A variety of techniques can be used to combine the term values, such as determining the centroid of the values for the terms (rows) in each context (columns), weighting different words more or less strongly based on their significance, and/or other factors. Such a context vector, with K dimensions, may be used to represent the semantic context 108. In another example, each of the rows of the T×K matrix may be a term vector for a corresponding term and can be used to determine a distance for each term vector from the context vector. The distance can be determined in a variety of ways, such as the cosign distance, the Euclidian distance, the normalized Euclidian distance, the ratio of distances between a term vector and the context vector, and/or any combination thereof. Such a collection of distance values for each term may also be used as the semantic context 108.

The computer system 100 can receive and used the local context 106 and the semantic context 108 for the dialog between user A 102 and user B 104 to determine probabilities that each of a vocabulary of words is likely to be a next word uttered by user A 102 in the dialog. As indicated by step A (122), the computer system 100 can access a neural network that includes an input layer, one or more hidden layers, and an output layer. The neural network can be any of a variety of networks, such as a recurrent neural network (RNN) and/or a multilayer perceptron (MLP), such as a deep believe network (DBN). The neural network can be modified to include an input layer with nodes for both the local context and the semantic context which are fully connected to at least one of the hidden layers of nodes. As described in greater detail below with regard to FIGS. 2A-B, the connections between the nodes of the input layer, the hidden layer(s), and the output layer can be weighted through any of a variety of training processes during which training data with verified input and output data are repeatedly passed through the neural network so as to identify appropriate adjustments to weighting values connecting nodes within the neural network.

As indicated by step B (124), the local context 106 and the semantic context 108 can be applied to the input layer of the neural network, which includes nodes for both local contextual input and semantic contextual input. The input that is applied for the local context 106 to the neural network can be sparse—meaning that non-null input values are provided to only a portion of the input nodes for the local context 106. For instance, predetermined values (e.g., true, 1) indicating that a word corresponding to a node is present in the local context 106 can be applied to appropriate nodes (e.g., nodes corresponding to the words "is" and "the") in the input layer. In contrast, input that is applied for the semantic context 108 can be dense—meaning that non-null input values are applied to all or nearly all of the nodes in the input layer of the neural network for the semantic context. In some implementations, the number of nodes in the input layer of the neural network for the semantic context may be a number of dimensions of the context vector (K) and the values applied can be the values of the context vector. In some implementations, the number of nodes in the input layer for of the neural network for the semantic context may be a number of words (terms) in a vocabulary and the values applied to those nodes can be determined distance values between term vectors and a context vector.

As indicated by step C (126), the computer system 100 can generate probability values for candidate words by propagating, through the connections between nodes in the neural network, the values applied to the input layer of the neural network through the hidden layer(s) and to the output layer. As discussed above, the connections between nodes in the neural network can be weighted based on training for the neural network, which can cause the values that are generated at the output layer to be varied and based on the local and semantic contexts. The values of the nodes at the output layer can indicate probabilities that words corresponding to the nodes are likely to be a next word that will be uttered by the user A 102. For instance, the values may range from 0.0 to 1.0, inclusive. Other ranges of values are also possible.

As indicated by step D (128), the computer system 100 can provide the probability values for one or more of the candidate words. For example, the computer system 100 may receive a hypothesis of candidate words for a speech sample from a speech recognition system. In response, the computer system 100 can perform the steps A-C to generate probability values for one or more of the candidate words, which the computer system 100 can provide to the speech recognition system for use in selecting an appropriate word for the speech sample. In some implementations, the computer system 100 may additionally select candidate words based on the determined probability values, such as selecting candidate words with probability values that are greater than a threshold value (e.g., 0.5, 0.6, 0.75, 0.8, 0.9). In another example, the computer system 100 can select a top group of candidate words (e.g., top 1 word, top 2 words, top 5 words) that have the greatest probability values (e.g., most likely to be uttered next by the user). The probability values and/or candidate words can be provided by the computer system 100 to any of a variety of appropriate other computing devices, such as a speech recognition system and/or a user computing device.

Figure 2A:
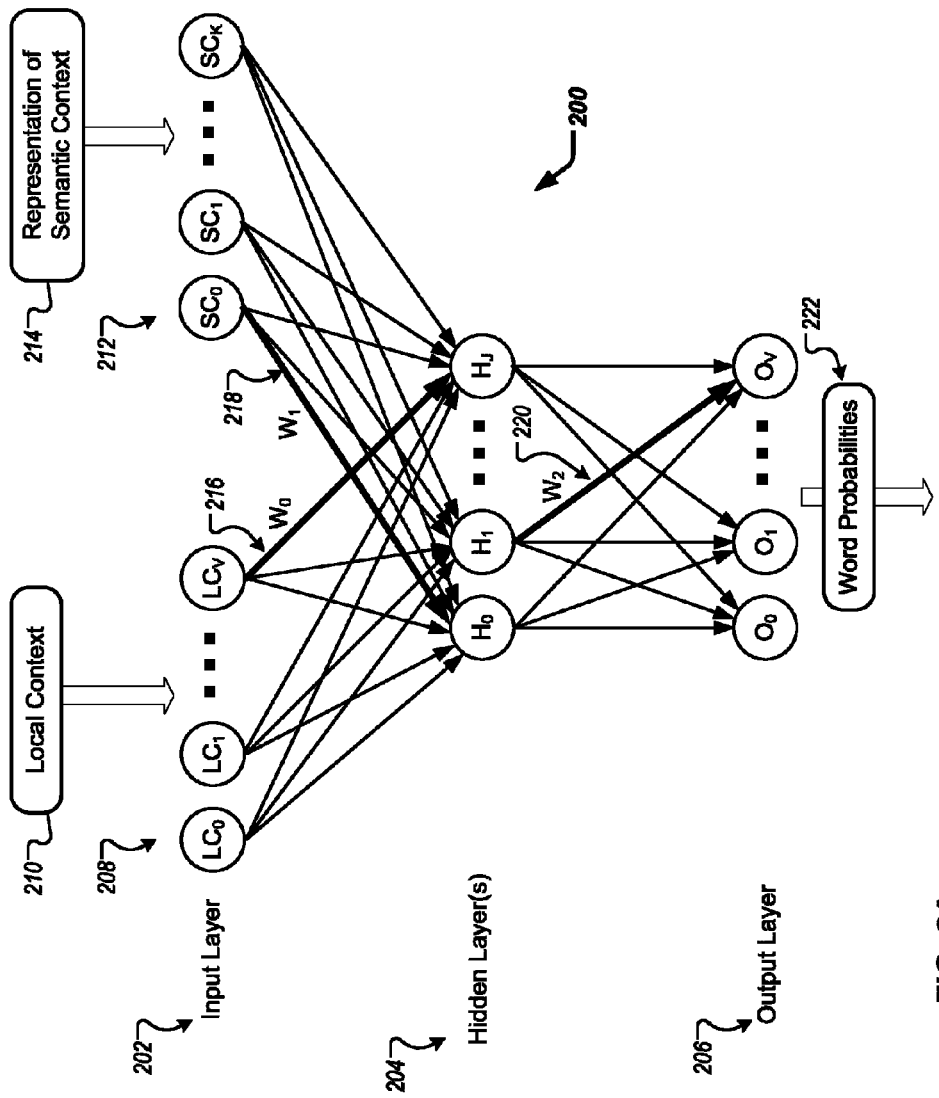
FIGS. 2A-B are example diagrams of a neural network that is modified to use both local context information and semantic context information.
Figure 2B:
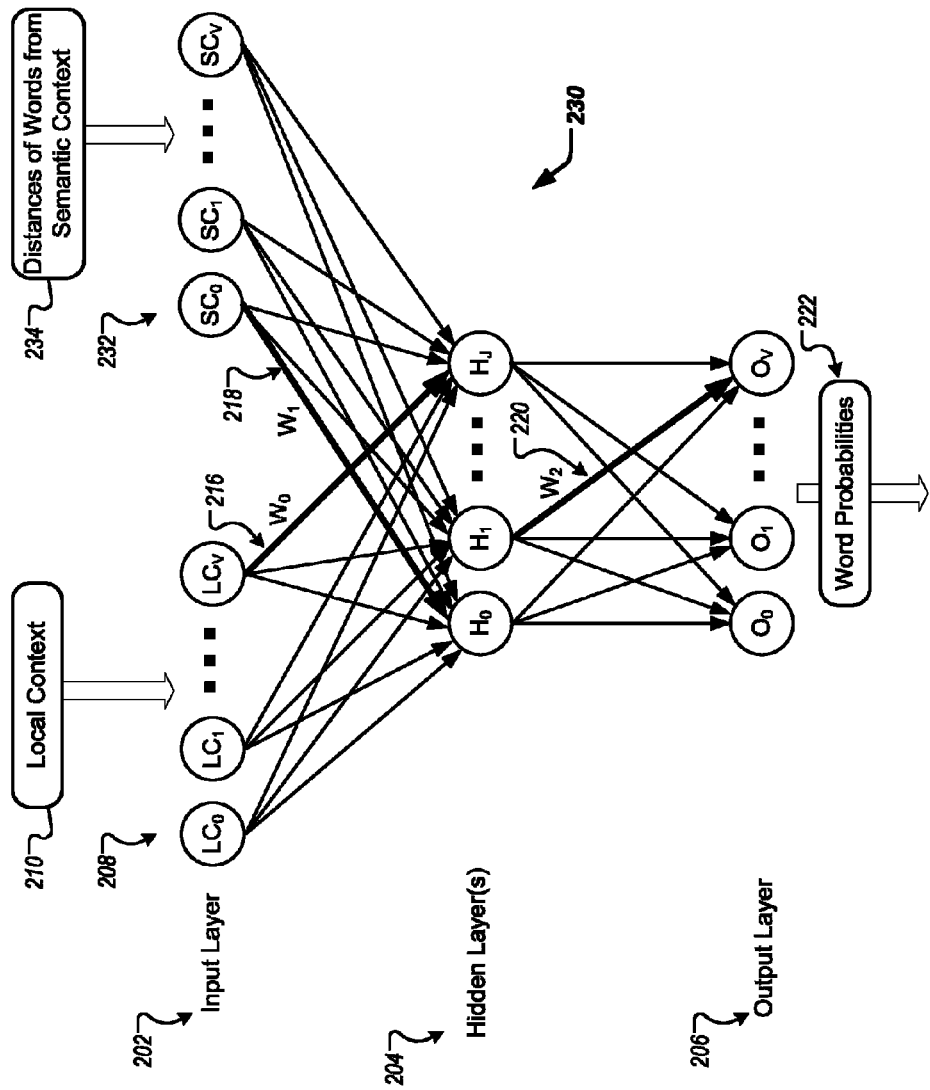

FIGS. 2A-B are example diagrams of a neural network that is modified to use both local context information and semantic context information. The neural network models that are described in FIGS. 2A-B may be used by a computer system determining word probabilities based on local and semantic contexts, such as the computer system 100.

Referring to FIG. 2A, a neural network 200 is depicted as including an input layer 202, one or more hidden layers 204, and an output layer 206. The neural network 200 can be any of a variety of networks, such as an RNN and/or a MLP (e.g., a DBN). The composition of and the connections between nodes within the input layer 202, the one or more hidden layers 204, and the output layer 206 can vary depending on the type of neural network that is being used for the neural network 200. For example, if the neural network 200 is an RNN, the nodes of the hidden layers 204 can be fully interconnected with each other such that each node of the hidden layer 204 is connected by each of the other nodes of the hidden layer 204. In contrast, if the neural network 200 is a MLP, the nodes of the hidden layer 204 may not be fully interconnected, as depicted in FIG. 2A.

The input layer 202 includes a first portion 208 that includes nodes $LC_0$-$LC_V$ through which input for a local context 210 can be provided. The number of nodes in the first portion 208 can correspond to the number of words V in a vocabulary of words. The input layer 202 can also include a second portion 212 that includes nodes $SC_0$-$SC_K$ through which a semantic context 214 can be provided as input. In the depicted example, the semantic context 214 corresponds to a representation of the semantic context through a vector with K dimension, such as the context vector described above with regard to FIG. 1.

As depicted, each of the nodes of the input layer 202 is connected to each of the nodes $H_0$-$H_J$ of at least a first layer of the one or more hidden layers 204. Such interconnection between nodes can be termed as the input layer 202 and the at least first layer of the hidden layers 204 being "fully connected." As indicated by the two connections 216 and 218 that are depicted as being darker/thicker, weights ($w_0$ and $w_1$) can be associated with the connections 216 and 218 based, at least in part, on training of the neural network using appropriate training data. Weights can indicate a level of association between two nodes, with greater weights indicating a greater association between two nodes and lesser weights indicating a minimal association between two nodes. Although not depicted explicitly, weights can be associated with each of the connections between nodes in the neural network 200.

Although only one hidden layer is depicted, other hidden layers are also possible. For instance, the neural network 200 may include any number of hidden layers, such as two, three, four, five, eight, or ten hidden layers. The hidden layers may be partially and/or fully connected to each other and the connections can have corresponding weights.

Like the connections between the input layer 202 and the hidden layers 204, at least a last hidden layer can be fully connected to the output layer 206. As indicated by the connection 220 that is fuller/thicker than the other connections, weights ($w_2$) can be associated with the connections between the hidden layers 204 and the output layer 206. These weights can be determined based on the application of training data to the neural network 200 and can indicate a level of association between nodes. The values that are propagated to the nodes of the output layer 206 (nodes $O_0$-$O_V$) can indicate probabilities 222 that the V words corresponding to the nodes are likely to be a next word that a user will utter. As described above, the word probabilities 222 can be of any of a variety of ranges (e.g., 0.0 to 1.0, −1.0 to 1.0).

Referring to FIG. 2B, a second neural network 230 is depicted that is similar to the neural network 200 that is described above with regard to FIG. 2A. The neural network 230 includes a different type of semantic context input and input nodes that correspond to the semantic context input. The neural network 230 can be any of a variety of networks, such as an RNN and/or a MLP (e.g., a DBN). The composition of and the connections between nodes within the input layer 202, the one or more hidden layers 204, and the output layer 206 can vary depending on the type of neural network that is being used for the neural network 200. For example, if the neural network 230 is an RNN, the nodes of the hidden layers 204 can be fully interconnected with each other such that each node of the hidden layer 204 is connected by each of the other nodes of the hidden layer 204. In contrast, if the neural network 230 is a MLP, the nodes of the hidden layer 204 may not be fully interconnected, as depicted in FIG. 2B.

In particular, the neural network 230 takes as input for a second portion 232 of nodes $SC_0$-$SC_V$ in the input layer 202 distances 234 for words V from a semantic context. For instance, referring to the LSA example described above with regard to FIG. 1, vectors for each of the words V can be compared to a context vector for the T×K matrix to determine a distance for each of the words. Distances can be determined in any of a variety of appropriate ways, such as by the dot product of the word vector and the context vector, the Euclidian distance, and/or the normalized Euclidian distance. The distance values for the words V can be applied to the second portion 232 of the input layer 202 and used to generate the word probabilities 222, similar to the description above with regard to FIG. 2A.

Figure 3:
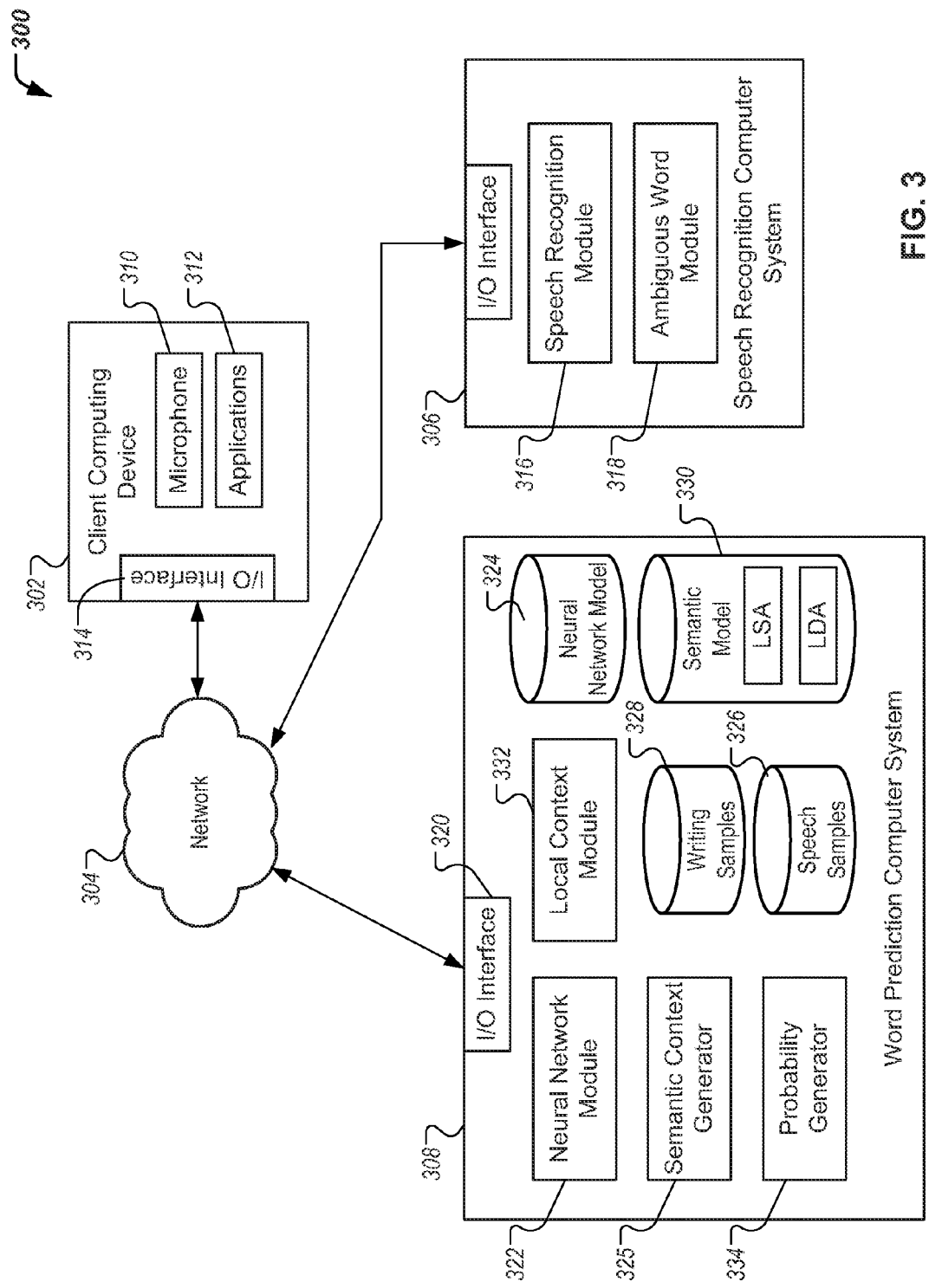
FIG. 3 depicts an example computer system for providing word predictions based on local and semantic contextual information.

FIG. 3 depicts an example computer system 300 for providing word predictions based on local and semantic contextual information. The computer system 300 includes a client computing device 302 that can generate audio signals that are transmitted over a network 304 to a speech recognition system 306, which can attempt to recognize speech within the audio signal and which can interact with a word prediction computer system 308 to obtain predictions of a next word to be uttered by a user (e.g., so as to prune candidate words in a speech recognition algorithm) and to resolve ambiguities between candidate words. The computer system 308 can be similar to the computer system 100 described above with regard to FIG. 1.

The client computing device 302 can be any of a variety of appropriate client computing devices, such as a laptop computer, a desktop computer, a mobile computing device (e.g., smartphone, tablet computing device, personal digital assistant, entertainment device), and/or an embedded computing device (e.g., computing system embedded within an automobile or TV). The client computing device 302 includes a microphone 310 through which an audio signal can be obtained by the client computing device. The client computing device 302 also includes one or more applications 312 that can formulate and transmit a request for the obtained audio signal to be converted to text by the speech recognition computer system 306. The client computing device 302 can include an input/output (I/O) interface 314 (e.g., WiFi card, mobile data network card, Ethernet card) that can transmit and receive information over the network 304.

The network 304 can be any of a variety of appropriate communication networks, such as the internet, a local area network (LAN), a wide area network (WAN), a virtual private network (VPN), a wireless network, an optical network, a cellular network, a mobile data network (e.g., 3G/4G data network), or any combination thereof.

The speech recognition computer system 306 can be any of a variety of appropriate computer systems, such as a distributed computer system (e.g., cloud computing system), a computer server system, a desktop computer, a laptop computer, and/or a mobile computing device. The speech recognition computer system 306 includes a speech recognition module 316 that receives audio signals and, using one or more speech models, converts the audio signals to text. While converting an audio signal to text, the speech recognition module 316 may transmit a local context for the audio signal (e.g., recent 2 words) to the word prediction computer system 308 to obtain probabilities for likely words that are to follow the local context. The speech recognition module 316 may use such probabilities for a variety of tasks, such as to prune the universe of potential words that are considered as candidates for a next word so as to reduce the processing load when analyzing the audio signal for the next word.

The speech recognition computer system 306 also includes an ambiguous word module 318 that attempts to resolve words for which the speech recognition module 316 has identified multiple candidate words. For instance, the speech recognition module 316 may identify an audio signal as being equally likely to be "surgeon" or "sturgeon." The ambiguous word module 318 can interact with the word prediction computer system 308 to obtain probabilities for that various candidate words are correct given the local and semantic context for the audio signal, and can use these probabilities to resolve ambiguities from the speech recognition module 316.

The word prediction computer system 308 includes an I/O interface 320 through which requests for word probabilities, local context information, and semantic context information can be received. The word prediction computer system 308 includes a neural network module 322 that can generate, train, and provide access to neural network models. The neural network module 322 can generate neural network models (e.g., RNN models, MLP models, DBN models) similar to those described above with regard to FIGS. 2A-B, which include an input layer with a first portion for local context input and a second portion for semantic context input. The neural network module 322 can store neural network models in a neural network model repository 324.

The word prediction computer system 308 can additionally include a semantic context generator 325 that can dynamically generate semantic contexts based on a variety of factors, such as an identity of a speaker, an identity of other users who are involved in a dialog with the speaker, demographic information associated with the speaker (e.g., language, age, gender, geographic location), and/or a type of computing device through which the audio signal was received. The semantic context generator 325 can generate a semantic model using example contexts, such as speech samples 326 and writing samples 328, which may be selected based on the factors identified above. The semantic context generator 325 can generate contexts using a variety of techniques, such as LSA, which indicates the likelihood that particular words will appear in various contexts, and LDA, which indicates the likelihood that particular topics will appear in various contexts. The semantic context generator 325 can store generated semantic models in a semantic model repository 330. The semantic context generator 325 may update and/or generate new semantic models periodically and/or on request. The semantic context generator 325 can additionally generate vectors and values to provide as semantic context input to neural networks using the semantic models 330, such as by generating a context vector from an LSA model and/or identifying distances for word vectors from the context vector.

The word prediction computer system 308 also includes a local context module 332 that identifies a local context for an audio signal, such as one or more previous words that were uttered by a user. For instance, the local context module 332 can obtain local context information from the speech recognition module 316 during conversion of an audio signal to text. The local context module 332 can provide the local context information to a probability generator 334 as input to the local context portion of the input layer of the neural network. Similarly, the semantic context generator 325 can provide semantic context information to the probability generator 334 as input to the semantic context portion of the input layer of the neural network. The probability generator 334 can generate probability information for a vocabulary of candidate words by propagating the input values through the neural network and outputting the probability values as output. The probability generator 334 can additionally selection one or more candidate words based on the generated probabilities and can provide information identifying the selected candidate words to the speech recognition computer system 306 and/or to the client computing device 302.

Although depicted a separate, in some implementations the word prediction computer system 308 can be part of the speech recognition computer system 306.

Figure 4:
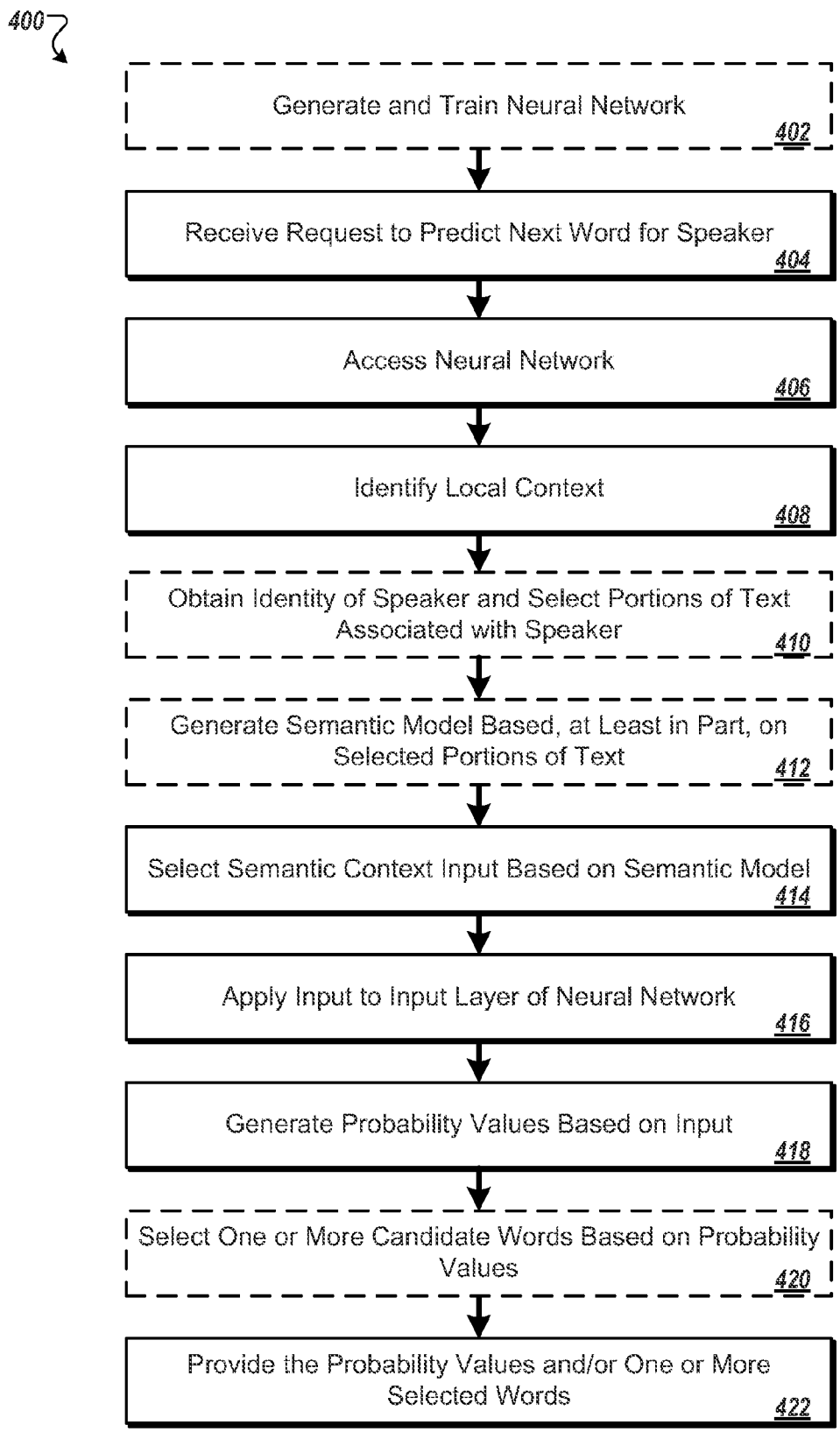
FIG. 4 depicts a technique for determining word probabilities based on local context and semantic context information.

FIG. 4 depicts a technique 400 for determining word probabilities based on local context and semantic context information. The technique 400 can be performed by any of a variety of appropriate computing devices, such as the computer system 100 and/or the computer system 300. The technique 400 can use a neural network, such as an RNN and/or an MLP (e.g., a DBN) that has been modified to include an input layer that includes a first portion for local context information and a second portion for semantic context information, such as the neural networks described above with regard to FIGS. 2A-B.

In some implementations, the technique 400 includes generating and training an neural network model (402). For example, the neural network module 322 can generate and train an neural network model (e.g., RNN models, MLP models, DBN models) using training data to weight the connections between the input layer, the one or more hidden layers, and the output layer of the neural network. The neural network module 322 can generate the neural network model to include an input layer with a first portion for local context information and a second portion for semantic context information.

At 404, a request can be received to predict a next word that will be uttered by a speaker. For example, the word prediction computer system 308 can receive a request from the client computing device 302 and/or from the speech recognition computer system 306 to provide a prediction of one or more next words that a speaker will say in a dialog.

In response to receiving the request, an neural network model can be accessed (406) and a local context can be identified (408). For example, a generated neural network model can be accessed from the neural network model repository 324 and the local context module 332 can identify a local context.

In some implementations, the identity of the speaker can be obtained and portions of text that are associated with the speaker can be obtained (410). For example, the semantic context generator 325 can obtain text that is associated with the speaker and/or other users who are currently engaged in a dialog with the speaker to which the received request pertains. Such text can be obtained from any of a variety of sources, such as the writing samples repository 328 and the speech samples repository 326. Using the selected portions of text (and/or other portions of text), a semantic model can be generated (412). For example, the semantic context generator 325 can generate an LSA and/or an LDA model based on the selected text that is associated with the speaker and/or other users who are engaged in a dialog with the speaker to which the received request pertains.

Semantic context information to be provided as input to the neural network model can be selected based on the semantic model (414). For example, K dimensions of a context vector that is derived from the semantic model can be selected and/or distances between word vectors and context vectors from a semantic model can be generated.

Local context information and semantic context information can be applied as input to the input layer of the neural network model (416). For example, local context information can be provided as sparse input to a first portion of the input later of the neural network model and semantic context information can be provided as dense input to a second portion of the input layer of the neural network model.

Probability values can be generated based on the applied input (418). For example, the probability generator 334 can propagate the input through the neural network using the weighted connections between nodes within the neural network. The input can be propagated such that output is generated at the nodes of the output layer of the neural network. The output values at the output layer can represent probabilities that words corresponding to the nodes are a next word that will be uttered by a speaker.

In some implementations, one or more candidate words can be selected based on the probability values (420). The probability values and/or the one or more selected words can be provided as output (422). For example, the probability generator 334 can select one or more words that have the greatest probability values from the vocabulary of candidate words and can provide information that identifies the selected one or more words to the speech recognition computer system 306 and/or to the client computing device 302.

Figure 5:
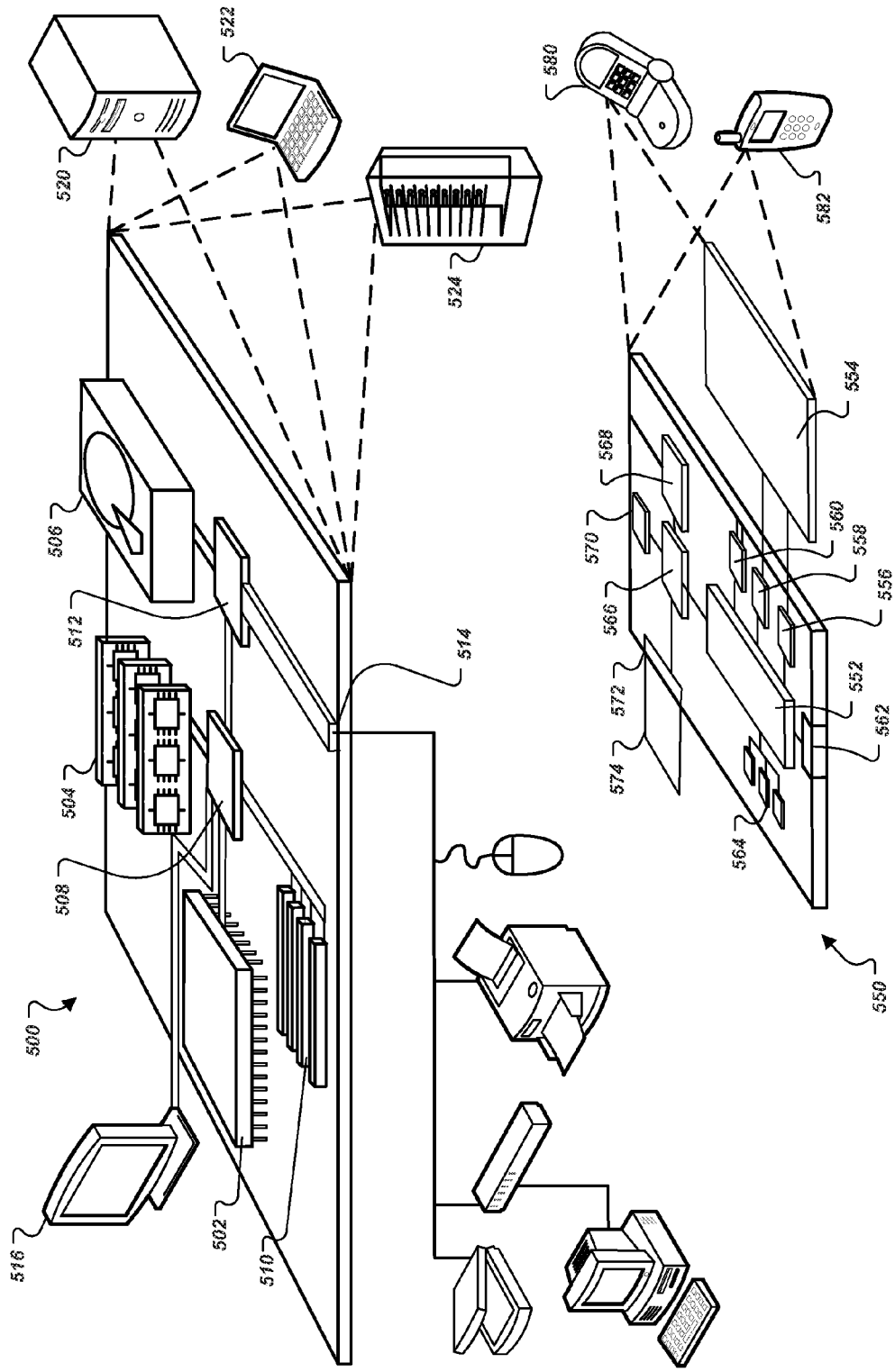
FIG. 5 shows an example of a computer device and a mobile computer device that can be used to implement the techniques described herein.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

The invention claimed is:

1. A computer-implemented method comprising:
   receiving, by a computer system, a request to predict a next word to occur in a phrase being uttered by a first user in a dialog between the first user and a second user;
   accessing, by the computer system, a neural network comprising i) an input layer that includes a first portion representing a local context for the phrase and a second portion representing a semantic context for the phrase, ii) one or more hidden layers that are at least partially interconnected with the input layer by first connections, and iii) an output layer that represents a vocabulary of candidate words and that is at least partially interconnected with at least one of the one or more hidden layers by second connections;
   identifying, by the computer system, the local context for the phrase being uttered by the first user;
   identifying, by the computer system, text of one or more previous messages communicated (i) between the first user and the second user, and (ii) before initiation of the dialog between the first user and the second user;
   determining, by the computer system and based at least on the identified text of the one or more previous messages, at least one vector that represent the semantic context for the phrase, the at least one vector including values for a plurality of dimensions;
   applying, by the computer system, input to the input layer of the neural network, the input comprising i) the local context of the phrase and ii) the values for the plurality of dimensions of the at least one vector that represents the semantic context of the phrase;
   generating, by the computer system, probability values for at least a portion of the candidate words in the vocabulary of the output layer based on propagation of the input through the neural network using, at least, the first connections and the second connections between layers of the neural network;
   using, by the computer system, the generated probability values to determine a transcription for the phrase uttered by the first user; and
   providing, by the computer system and as output of an automated speech recognizer, the transcription determined using the generated probability values.

2. The computer-implemented method of claim 1, wherein the local context includes either i) at least one preceding word from a current position in the dialog that was uttered by the first user or ii) a start of sentence token that indicates that the next word is a first word being uttered by the first user.

3. The computer-implemented method of claim 2, wherein:
   the first portion of the input layer comprises a plurality of nodes that represent a plurality of words, and
   applying the local context as part of the input to the input layer comprises providing a predetermined value to a portion of the plurality of nodes that correspond to the at least one preceding word that comprises the local context, the predetermined value indicating that a word is part of the local context for the phrase.

4. The computer-implemented method of claim 1, wherein:
   the first portion of the input layer comprises a plurality of first nodes that represent a plurality of words,
   a particular hidden layer from the one or more hidden layers comprises a plurality of hidden nodes, and
   a first portion of the first connections fully connect the plurality first nodes with the plurality of hidden nodes such that each of the plurality of first nodes is connected to each of the plurality of hidden nodes.

5. The computer-implemented method of claim 4, wherein:
   the second portion of the input layer comprises a plurality of second nodes that represent the plurality of dimensions of the at least one vector, the input applied to the second nodes comprising the values for the plurality of dimensions, the values for the plurality of dimensions comprising centroids of at least a portion of the plurality of words in the semantic context for the phrase, and a second portion of the first connections fully connect the plurality second nodes with the plurality of hidden nodes such that each of the plurality of second nodes is connected to each of the plurality of hidden nodes.

6. The computer-implemented method of claim 4, wherein:
the second portion of the input layer comprises a plurality of second nodes that represent the plurality of words, the input applied to the second nodes comprising values that represent distances from the plurality of words to the semantic context for the phrase that is represented by the at least one vector, and
a second portion of the first connections fully connect the plurality second nodes with the plurality of hidden nodes such that each of the plurality of second nodes is connected to each of the plurality of hidden nodes.

7. The computer-implemented method of claim 1, wherein:
a particular hidden layer from the one or more hidden layers comprises a plurality of hidden nodes,
the output layer comprises a plurality of output nodes that represent the vocabulary of candidate words, and
the second connections fully connect the plurality hidden nodes with the plurality of output nodes such that each of the plurality of hidden nodes is connected to each of the plurality of output nodes, each of the second connections including a weighting value that quantifies an association between two nodes and that is used to propagate the input values through the neural network.

8. The computer-implemented method of claim 1, wherein the at least one vector that represents the semantic context for the phrase comprises at least one vector generated using a latent semantic analysis (LSA) model.

9. The computer-implemented method of claim 1, wherein the at least one vector that represents the semantic context for the phrase comprises at least one vector generated using a latent dirichlet allocation (LDA) model.

10. The computer-implemented method of claim 1, further comprising:
obtaining a transcription of one or more previous utterances spoken by the first user or to the first user by the second user during the dialog;
wherein determining at least one vector that represent the semantic context for the current phrase is performed based on the obtained transcription.

11. The computer-implemented method of claim 1, wherein the one or more previous messages comprise an email or text message written by the first user.

12. The computer-implemented method of claim 1, wherein the one or more previous messages comprise an email or text message written by the second user.

13. The computer-implemented method of claim 1, further comprising:
determining an identity of the first user; and
wherein identifying text of one or more previous messages is performed based on the determined identity of the first user.

14. The computer-implemented method of claim 13, further comprising:
determining an identity of the second user; and
wherein identifying text of one or more previous messages is further performed based on the determined identity of the second user.

15. The computer-implemented method of claim 14, further comprising:
obtaining a first transcription of one or more previous utterances spoken by the first user;
obtaining a second transcription of one or more previous utterances spoken by the second user;
obtaining a first writing sample written by the first user before initiation of the dialog between the first user and the second user;
obtaining a second writing sample written by the second user before initiation of the dialog between the first user and the second user; and
wherein determining at least one vector that represents the semantic context for the current phrase comprises determining the at least one vector based on the first transcription, the second transcription, the first writing sample, and the second writing sample.

16. The computer-implemented method of claim 15, further comprising:
obtaining a third transcription of one or more previous utterances spoken by the first user or the second user during the dialog; and
obtaining a third writing sample written before initiation of the dialog between the first user and the second user from a written communication between the first user and the second user;
wherein determining at least one vector that represents the semantic context for the current phrase comprises determining the at least one vector based on the first transcription, the second transcription, the third transcription, the first writing sample, the second writing sample and the third writing sample.

17. A computer system comprising:
one or more computers;
an interface to the one or more computers that is programmed to receive a request to predict a next word to occur in a phrase being uttered by a first user in a dialog between the first user and a second user;
a neural network module that is programmed to access a neural network comprising i) an input layer that includes a first portion representing a local context for the phrase and a second portion representing a semantic context for the phrase, ii) one or more hidden layers that are at least partially interconnected with the input layer by first connections, and iii) an output layer that represents a vocabulary of candidate words and that is at least partially interconnected with at least one of the one or more hidden layers by second connections;
a local context module that is programmed to identify the local context for the phrase being uttered by the first user;
a semantic context generator that is programmed to:
identify text of one or more previous messages communicated (i) between the first user and the second user, and (ii) before initiation of the dialog between the first user and the second user, and
determine, based at least on the identified text of the one or more previous messages, at least one vector that represent the semantic context for the phrase, the at least one vector including values for a plurality of dimensions; and
a probability generator that is programmed to:
apply input to the input layer of the neural network, the input comprising i) the local context of the phrase and ii) the values for the plurality of dimensions of the at least one vector that represents the semantic context of the phrase,
generate probability values for at least a portion of the candidate words in the vocabulary of the output layer based on propagation of the input through the neural network using, at least, the first connections and the second connections between layers of the neural network, use the generated probability values to determine a transcription for the phrase uttered by the first user, and provide, as output of an automated speech recognizer, the transcription determined using the generated probability values.

18. The computer system of claim 17, wherein the local context comprises at least one preceding word from a current position in the dialog that was uttered by the first user.

19. The computer system of claim 18, wherein:
the first portion of the input layer comprises a plurality of nodes that represent a plurality of words, and
applying the local context as part of the input to the input layer comprises providing a predetermined value to a portion of the plurality of nodes that correspond to the at least one preceding word that comprises the local context, the predetermined value indicating that a word is part of the local context for the phrase.

20. A computer program product embodied in a computer readable storage device storing instructions that, when executed, cause one or more computing devices to perform operations comprising:

receiving, by a computer system, a request to predict a next word to occur in a phrase being uttered by a first user in a dialog between the first user and a second user;

accessing, by the computer system, a neural network comprising i) an input layer that includes a first portion representing a local context for the phrase and a second portion representing a semantic context for the phrase, ii) one or more hidden layers that are at least partially interconnected with the input layer by first connections, and iii) an output layer that represents a vocabulary of candidate words and that is at least partially interconnected with at least one of the one or more hidden layers by second connections;

identifying, by the computer system, the local context for the phrase being uttered by the first user;

identifying, by the computer system, text of one or more previous messages communicated (i) between the first user and the second user, and (ii) before initiation of the dialog between the first user and the second user;

determining, by the computer system and based at least on the identified text of the one or more previous messages, at least one vector that represent the semantic context for the phrase, the at least one vector including values for a plurality of dimensions;

applying, by the computer system, input to the input layer of the neural network, the input comprising i) the local context of the phrase and ii) the values for the plurality of dimensions of the at least one vector that represents the semantic context of the phrase;

generating, by the computer system, probability values for at least a portion of the candidate words in the vocabulary of the output layer based on propagation of the input through the neural network using, at least, the first connections and the second connections between layers of the neural network;

using, by the computer system, the generated probability values to determine a transcription for the phrase uttered by the first user; and providing, by the computer system and as output of an automated speech recognizer, the transcription determined using the generated probability values.

* * * * *